United States Patent Office 3,257,067
Patented June 21, 1966

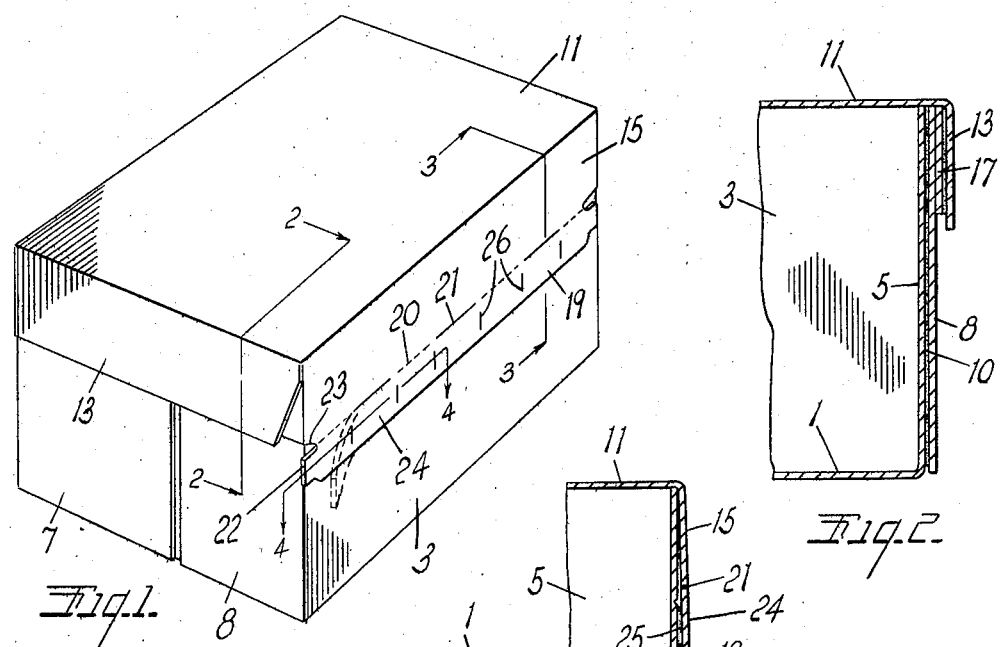

3,257,067
CARTON
Kenneth T. Buttery and David D. Cornell, Kalamazoo, Mich., assignors to KVP Sutherland Paper Company, Kalamazoo, Mich.
Filed May 3, 1963, Ser. No. 277,787
The portion of the term of the patent subsequent to April 7, 1981, has been disclaimed
12 Claims. (Cl. 229—51)

This invention relates to a carton which is sealed when initially filled and may be quickly opened and reclosed to protect contents.

The main objects of this invention are:

First, to provide a carton formed of an integral blank which is sealed when initially filled and which may be quickly opened and reclosed in the event all of the original contents are not removed at one time and a carton may be used for other purposes after the original contents are removed.

Second, to provide a carton embodying these advantages which may be formed of relatively light paperboard stock and at the same time is strong and rigid and well adapted for packaging of products such as heavy food products.

Objects relating to details and economies of the invention will appear from the description to follow: The invention is defined and pointed out in the claims.

A preferred embodiment of the invention is illustrated in the accompanying drawing, in which:

FIG. 1 is a perspective view of a carton embodying my invention closed and sealed.

FIG. 2 is an enlarged fragmentary view in vertical section on a line corresponding to line 2—2 of FIG. 1.

FIG. 3 is an enlarged fragmentary view in vertical section on a line corresponding to line 3—3 of FIG. 1.

FIG. 4 is an enlarged fragmentary view in horizontal section on a line corresponding to line 4—4 of FIG. 1.

FIG. 5 is a plan view of the blank from which the embodiment of our invention illustrated is formed.

The embodiment of our invention illustrated is adapted for packaging foods of various types but is especially desirable for packaging of food such, for example as ice cream or cottage cheese which are heavy in proportion to volume.

The embodiment of our invention illustrated is formed of an integral blank, see FIG. 5, comprising a bottom 1, rear wall 2 and front wall 3 which are connected to the bottom by the score lines 4. The several score lines are conventionally illustrated. The end walls 5 are dimensioned to correspond to the width and height of the carton and are connected to the bottom by the score lines 6.

The rear and front walls 2 and 3 have complementary end wall members 7 and 8 connected thereto by the score lines 9. These outer end wall members 7 and 8 are disposed on the outer sides of and fixedly secured to the inner end walls 5, desirably by adhesive indicated at 10, see FIG. 2.

The top or cover 11 is hingedly connected to the upper edge of the rear wall by the score line 12 and provided with end flaps 13 connected thereto by score lines 14. The top is provided with a front flap 15 extending from end to end thereof and connected thereto by the score line 16. This front flap 15 has coupling or securing flaps 17 at its ends connected thereto by the scores 18. These flaps 17 are disposed on the inner sides of the top end flaps 13 and fixedly secured thereto desirably by adhesive as is conventionally illustrated in FIG. 2.

The front cover flap 15 of the top or cover 11 has an attaching strip 19 on its outer edge detachably connected thereto by the aligned spaced foraminations 20 and slits 21 therebetween. It will be noted that the outer slits 21 are spaced from the ends of the attaching strip 19. In the embodiment illustrated the attaching strip 19 is provided with finger tabs 22 at its ends, these tabs being formed or resulting from the notches 23 aligned with the severing scores and slits.

In this embodiment of applicants invention portions 24 of the attaching strip 19, which are laterally disposed relative to the slits 21, are detachably secured to the front wall desirably by spaced spots or patterns of adhesive conventionally illustrated at 25, see FIGS. 3 and 4. These spaced spots or patterns of adhesive are preferably surrounded by slits in the outer surface of the front wall. These slits when present surround the glue patterns illustrated by numeral 25.

The attaching strip 19 is provided with transverse slits 26 disposed at each side of the adhesive zones. These transverse slits 26 in the attaching strip facilitate the disengagement of the attaching strip and its removal from the front flap 15.

In the embodiment illustrated the tear strip 19 may be conveniently grasped at either end. The transverse slits 26 in the tear strip serve as flexing zones and result in a highly desirable peeling action at the glue areas. As the sealing strip is being pulled outwardly resistance results along the foraminated zones until a transverse flexing zone 26 is reached and this results in the outward flexing of the strip which flexing may be nearly 90°. This outward flexing at these points or zones greatly facilitates the tearing away of the strip at the adhered zones. These flexing zones substantially reduce the resistance to the removal of the strip as the removal force is consecutively applied to the glue area.

We have not illustrated the carton in open position or with the attaching strip 19 removed as it is believed it will be appreciated that with the attaching strip removed a hinged cover results having a front portion 15 and end portions 13 which are supportingly connected.

The cover is hingedly connected to the rear wall 2 at 12 so that it may be repeatedly opened and closed as use may require. For example, it is quite common that the entire contents of the carton are not removed at one time and it is therefore desirable that the carton may be reclosed. Also, the carton embodying our invention may be used for other purposes after its original contents have been removed. Further, the carton is strong and rigid in proportion to the weight of the material, such as fiberboard stock from which it is formed and which may be quite thin.

We have illustrated and described our invention in a highly practical embodiment thereof. We have not attempted to illustrate or describe other embodiments or adaptations contemplated as it is believed that this disclosure will enable those skilled in the art to embody or adapt our invention as may be desired.

Having thus described the invention, what is claimed as new and desired to secure by Letters Patent is:

1. A carton formed of a unitary cut and scored blank and comprising a bottom and front and rear walls and inner end wall members, the front and rear walls having outer end wall members disposed on the outer sides of and secured to said inner end wall members, and a top hingedly connected to the rear wall and having front and end flaps, the front flap having coupling flaps on its ends to which top end flaps are secured, said front flap having an attaching strip on its lower edge extending from end to end thereof, said attaching strip being detachably connected to the lower edge of said top front flap by spaced foraminations having slits therebetween, the slits being spaced from the ends of said strip, said attaching strip being releasably secured to the front wall by zones of adhesive transversely aligned with said slits, said attaching strip having transverse flexing zones therein facilitating bending disposed at the ends of the spaced zones thereof adhered to said front wall.

2. A carton formed of a unitary cut and scored blank and comprising a bottom and front and rear walls, the bottom, front and rear walls having end wall members attached thereto, and a top hingedly connected to the rear wall and having front and end flaps, the front flap having coupling flaps on its ends to which top end flaps are secured, said front flap having an attaching strip on its lower edge extending from end to end thereof, said attaching said attaching strip being detachably connected to the lower edge of said top front flap by spaced foraminations having slits therebetween, the slits being spaced from the ends of said strip, said attaching strip being releasably secured to the front wall by zones of adhesive transversely aligned with said slits.

3. A carton formed of a unitary cut and scored blank and comprising a bottom and front and rear walls and inner end wall members, all of substantially the same height, the front and rear walls having outer end wall members disposed on the outer sides of said inner end wall members, and a top hingedly connected to the rear wall and having front and end flaps, the front flap having coupling flaps on its ends disposed on the inner sides of and to which top end flaps are secured, said front flap having an attaching strip on its lower edge extending from end to end thereof, said attaching strip being severably connected to the lower edge of said top front flap, said attaching strip being adhesively secured to the front wall by spaced zones of adhesive, said spaced zones of adhesive being surrounded by slits in the outer surface of the front wall and said attaching strip having spaced transverse cuts therein located adjacent the ends of said spaced zones of adhesive.

4. A carton formed of a unitary cut and scored blank and comprising a bottom and front and rear walls and end wall members, the bottom front and rear walls having end wall members attached thereto, and a top hingedly connected to the rear wall and having front and end flaps, the front flap having coupling flaps on its ends to which the top end flaps are secured, said front flap having an attaching strip on its lower edge, said attaching strip being severably connected to the lower edge of said top front flap, said attaching strip being adhesively secured to the front wall by spaced zones of adhesive, said attaching strip having weakened transverse flexing zones therein facilitating bending disposed at the ends of the spaced zones of adhesive which secure spaced portions of said attaching strip to said front wall.

5. A unitary carton comprising a body portion including a bottom, front and rear walls and first end wall members, the front and rear wall having second end wall members on the ends thereof disposed in lapping relation to said first end wall members and secured thereto and coacting therewith to support said walls in erected position, and a top hingedly connected to the rear wall and having front and end flaps of substantial width, the front flap having coupling flaps on its ends secured to said top end flaps, said front flap having an attaching strip on its lower edge extending from the end to end thereof and detachably secured thereto by spaced severing foraminations having slits therebetween, the outer slits being spaced from the ends of said attaching strip, said attaching strip being severably connected to said front wall by spaced zones of adhesive, said slits being disposed between said adhesive zones and said front flap.

6. A unitary carton comprising a body portion including a bottom having front and rear walls and first end wall members projecting upwardly therefrom, the front and rear walls having second end wall members on the ends thereof disposed in lapping relation to said first end wall members and secured thereto and coacting therewith to support said walls in erected position, and a top hingedly connected to the rear wall and having front and end flaps of substantial width, the front flap having coupling flaps on its ends secured to said top end flaps, said front flap having an integral attaching strip on its lower edge detachably secured thereto and secured to said front wall by spaced zones of adhesive, said attaching strip having transverse slits therein disposed between the portions thereof releasably secured to said front wall.

7. A unitary carton comprising a body portion including a bottom having front and rear walls and first end wall members projecting upwardly therefrom, the front and rear walls having second end wall members on the ends thereof disposed in lapping relation to said first end wall members and coacting therewith to support said walls in erected position, and a top hingedly connected to the rear wall and having front and end flaps of substantial width, the front flap having coupling flaps on its ends secured to said top end flaps, said front flap having an integral attaching strip on its lower edge detachably secured by adhesive, said adhesive being present in spaced zones and said spaced zones of adhesive being surrounded by slits in the outer surface of the carton front wall, said attaching strip having spaced transverse cuts therein located adjacent the ends of said spaced zones of adhesive.

8. A carton formed of a unitary cut and scored blank of fiberboard and comprising a bottom, front, rear and end walls, and a top hingedly connected to the rear wall and having a front flap overlapping the front wall when the carton is erected, said front flap having an attaching strip on its outer edge extending from end to end thereof and detachably connected thereto by spaced severable zones having slits therebetween, the slits being spaced from the ends of the strip, said attaching strip being releasably secured to the front wall by adhesive transversely aligned with said slits, said attaching strip having transverse slits therein facilitating flexing thereof disposed at the ends of the portions thereof adhered to said front wall.

9. A carton formed of a unitary cut and scored blank of fiberboard and comprising a bottom, front, rear and end walls, and a top hingedly connected to the rear wall and having a front flap overlapping the front wall when the carton is erected, said front flap having an attaching strip on its outer edge extending from end to end thereof and detachably connected thereto by spaced severable zones having slits therebetween, said attaching strip being releasably secured to the front wall by adhesive transversely aligned with said slits, said attaching strip having transverse slits therein facilitating flexing thereof disposed at the ends of the portions thereof adhered to said front wall.

10. A carton formed of a unitary cut and scored blank of fiberboard and comprising a bottom, front, rear and end walls, and a top hingedly connected to the rear wall and having a front flap overlapping the front wall when the carton is erected, said front flap having an attaching strip on its outer edge detachably connected thereto by spaced severing zones having slits therebetween, the slits being spaced from the ends of the strip, said attaching strip being releasably secured to the front wall by means transversely aligned with said slits, said attaching strip having transverse flexing zones disposed at the ends of the portions thereof releasably secured to said front wall.

11. A carton formed of a unitary cut and scored blank of fiberboard and comprising a bottom, front, rear and end walls, and a top hingedly connected to the rear wall and having a front flap overlapping the front wall when the carton is erected, said front flap having an attaching strip on its outer edge detachably connected thereto by spaced severing zones having slits therebetween, said attaching strip being releasably secured to the front wall by means transversely aligned with said slits, said attaching strip having transverse flexing zones disposed at the ends of the portions thereof releasably secured to said front wall.

12. A carton formed of a unitary cut and scored blank comprising a bottom and front, rear and end walls, and a top hingedly connected to said rear wall and having a front flap overlapping the front wall when the carton is erected, said front flap having an attaching strip on its lower edge detachably connected thereto, said attaching strip being adhesively secured to said front wall by spaced zones of adhesive, said spaced zones of adhesive being surrounded by slits in the outer surface of said front wall and said attaching strip having spaced transverse cuts therein for facilitating bending and removal thereof.

References Cited by the Examiner
UNITED STATES PATENTS

| | | | |
|---|---|---|---|
| 2,747,788 | 5/1956 | Tilly | 229—51 X |
| 2,782,980 | 2/1957 | Rueckert | 229—51 |
| 3,027,998 | 4/1962 | Ridgway | 206—45.34 |
| 3,040,957 | 6/1962 | Meyers | 229—37 |
| 3,109,577 | 11/1963 | Knipp | 229—51 |
| 3,144,980 | 8/1964 | Larson | 229—51 |

FOREIGN PATENTS 515,282  11/1939  Great Britain.

FRANKLIN T. GARRETT, *Primary Examiner.*